United States Patent [19]

Gerken et al.

[11] Patent Number: 5,787,444

[45] Date of Patent: Jul. 28, 1998

[54] METHOD AND APPARATUS FOR MAINTAINING REVISION CONTOL OF A SET OF OBJECTS WITHIN A DATA PROCESSING SYSTEM

[75] Inventors: Christopher Henry Gerken, Apex; Bruce Walter Hanover, Cary; Stacy Renee Joines, Raleigh; Ruth E. Willenborg, Apex, all of N.C.

[73] Assignee: International Business Machines Corp., Armonk, N.Y.

[21] Appl. No.: 492,389

[22] Filed: Jun. 19, 1995

Related U.S. Application Data

[63] Continuation of Ser. No. 31,757, Mar. 15, 1993, abandoned.

[51] Int. Cl.⁶ ................................................ G06F 17/30
[52] U.S. Cl. ................................................ 707/203
[58] Field of Search ....................... 395/600, 425, 395/650; 707/203

[56] References Cited

U.S. PATENT DOCUMENTS

| | | | |
|---|---|---|---|
| 4,425,618 | 1/1984 | Bishop et al. | 364/300 |
| 4,558,413 | 12/1985 | Schmidt et al. | 364/300 |
| 4,575,827 | 3/1986 | Kulakowski | 365/230 |
| 4,627,019 | 12/1986 | Ng | 364/900 |
| 4,635,189 | 1/1987 | Kendall | 364/200 |
| 4,641,274 | 2/1987 | Swank | 364/900 |
| 4,646,229 | 2/1987 | Boyle | 395/600 |
| 4,686,620 | 8/1987 | Ng | 364/200 |
| 4,727,482 | 2/1988 | Roshon-Larsen et al. | 364/200 |
| 5,247,658 | 9/1993 | Barrett et al. | 395/600 |
| 5,386,559 | 1/1995 | Eisenberg et al. | 395/600 |

OTHER PUBLICATIONS

Software–Practive and Experience, vol. 15(7), 637–654 Jul. 1985 Walter F. Tichy "RCS—A System For Version Contnrol".

IEEE 1982, 0270/5257/82/0000/0058S00.75, Walter F. Tichy, pp. 58–67 "Design, Implementation, and Evaluation of a Revision Control System".

IEEE Transactions on Software Engineering, vol. SE-1, No. 4, Dec. 1975 "The Source Code Control System", Mark J. Rochkind, pp. 364–370.

*Primary Examiner*—Thomas G. Black
*Assistant Examiner*—Jack M. Choules
*Attorney, Agent, or Firm*—Gregory M. Doudnikoff

[57] ABSTRACT

A method and system for maintaining revision control of a set of objects within a data processing system, wherein the set of objects are linearly interrelated, such that a subsequent object is related to a preceding object. Each object is created, accessed and maintained within a hierarchial promotion structure having a number of levels. A first database is created, which includes data identifying the linear interrelation between objects within the set of objects. The data includes a revision identifier associated with each set of objects. A status indicator is associated with each object within the hierarchial promotion structure, wherein a user may access the set of objects utilizing a revision identifier or hierarchial promotion structure indicator.

19 Claims, 15 Drawing Sheets

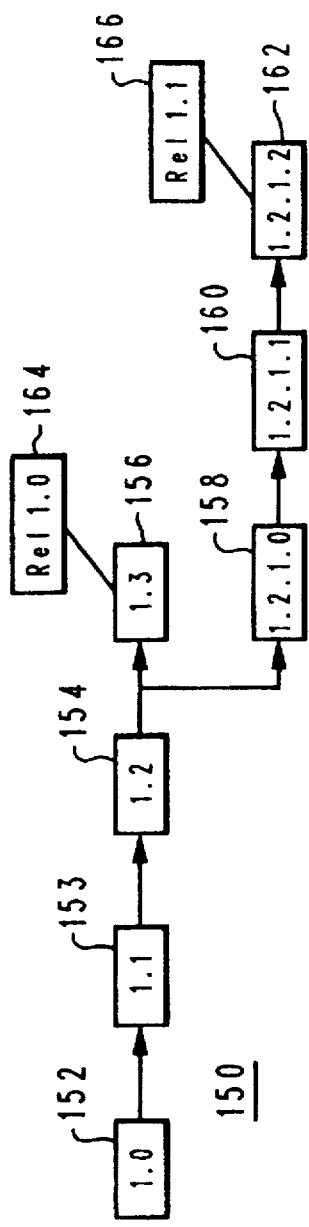
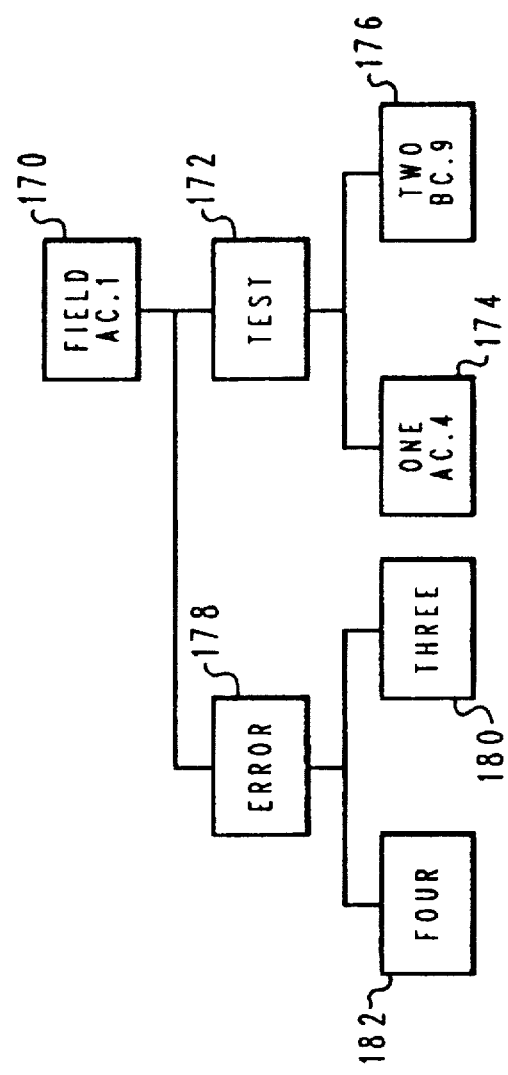
Fig. 1
Prior Art
Fig. 2
Prior Art

METHOD AND APPARATUS FOR MAINTAINING REVISION CONTOL OF A SET OF OBJECTS WITHIN A DATA PROCESSING SYSTEM

This is a continuation of application Ser. No. 08/031,757 filed Mar. 15, 1993, now abandoned.

BACKGROUND OF THE INVENTION

1. Technical Field

The present invention relates in general to an improved data processing system and in particular to an improved method and system for managing objects. Still more particularly, the present invention relates to an improved method and system for controlling various revisions of objects.

2. Description of the Related Art

A library management system or facility in a data processing system is a repository for objects such as, for example, computer programming code, related textual information, and various types of data. An "object" is anything that may exist or occupy space in storage within a data processing system and upon which operations can be performed; for example, programs, files, libraries, directories and folders. A "revision" is a logical representation of an object's state, as stored by the library manager. For example, a document is an object. Any modifications to the document result in a new revision. A change or modification to the revision results in yet another revision of the document. Consequently, an object may have a single original revision along with many revisions originating from that first original revision.

As with other libraries, information may be taken from the library for use. The information also may be changed as a result of such use or from additional data becoming available. The altered information then can be returned to the library, either unchanged or modified, resulting in the creation of a revision. A library should be organized so that information can readily be retrieved and returned to its proper place. It is most desirable that the information in the library be arranged so that it can be retrieved, replaced, and modified quickly. Moreover, it is desirable to be able to store each object efficiently, utilizing a minimum amount of computer storage, typically disk storage.

One problem found in library management systems is the fact that objects may be often modified to produce new revisions. Such revisions may be introduced to provide either a new or improved function to an object or to correct errors in an object. Additionally, new revisions may be created to add data to an object. A computer program is an example of an object that may be often modified. In the case of computer programs, generally speaking, successful computer programs in the market place typically have many revisions of the program, which are sequentially released with modifications to improve the program. This situation is particularly true for programs that operate on large computer systems, such as a mainframe computer.

The presently available systems for library management follow two models well known to those skilled in the art: (1) the branching model or (2) the hierarchical promotion model. The branching model stores revisions and derivation histories of objects outlining the relationship between revisions. Unless explicitly deleted by a user, any revision saved under this model is always recoverable. Additionally, the branching model allows for concurrent development. In other words, the branching model allows for various programmers or users to modify a particular revision of an object at the same time. FIG. 1 is a block diagram illustrating a branching model known in the prior art. Object 150 has a number of revisions. Object 150 was originally created as revision 1.0, as illustrated at block 152, also called the "primary revision". A modification of revision 1.0 sent back to a library manager creates revision 1.1, as illustrated in block 153. Revision 1.2, depicted at block 154 was created by a modification to revision 1.1 sent back to the library manager. Similarly revision 1.3, at block 156, is based on revision 1.2. Object 150 has a parallel branch created from revision 1.2. This revision is revision 1.2.1.0, as depicted in block 158. Revision 1.2.1.1, as illustrated at block 160, was created from some alteration of revision 1.2.1.0. Similarly, revision 1.2.1.2, at block 162, was created from a change to revision 1.2.1.1. Label 164 and label 166 are simple string labels attached to a particular revision in the branching model of object 150.

A user may therefore retrieve any revision located in this branching model by identifying the revision model, for example, 1.0, 1.1, etc. Additionally, a revision may be identified and retrieved by a string label if that revision has a string label associated with it. Additionally, merger of revisions may be accomplished by supplying the two revisions to be modified and the common base revision to the two revisions. Unfortunately, no mechanism is provided to force a merger of two concurrent developments in the branching model.

Revision Control System (RCS) is an example of a library manager that utilizes a branching method. A more detailed description of RCS may be found in an article by Walter F. Tichy, RCS-A System for Revision Control, Software-Practical and Experience, Vol. 15 (7) pp. 637–654 (July 1985).

The hierarchical promotion model provides multiple concurrent views of objects in various levels, e.g., in development, testing, and in production. The hierarchical promotion model controls objects as they are changed and promoted. In addition, concurrent development may be prevented or indicated by the promotion hierarchical model. In this manner, at most one revision of an object may be seen in a group by a user or group of users.

Referring now to FIG. 2, a block diagram illustrating a hierarchical promotion model is depicted. In this model, groups are formed for various stages in a development process for an object and act as an index into the set of revisions for each object. In this particular example, the objects are programs. Group 170, "Field", refers to the revision of each program in production. Group 172 is a "Test" group set up for testing programs. Groups 174 and 176 represent development groups "One" and "Two" in which programs are developed for use. Group 178 is an "Error" group defined for testing programs in the field corrected for errors. Groups 180 and 182 represent "Three" and "Four" groups for correction of errors. A programmer in group 174 may modify program AC.4 (program AC, revision 4) a programmer in group 176 may modify a different program such as BC.9 (program BC, revision 9). If the programmer utilizing group 176 desired to examine a program AC, the programmer would see AC.1 (program AC, revision 1). No access is allowed to AC.1 from group 176 until a promotion occurs. For example, if a programmer in group 174 finishes working on AC.4 that programmer may promote or shift AC.4 into group 172 for testing. Program AC.4 may be again promoted to group 170. In such a case, AC.1 would be replaced by AC.4 in group 170.

In contrast to the branching model, various revisions are reassigned labels depending on promotion of the revision. In a hierarchical promotion model, revisions may be moved or promoted up the structure and copied down the structure for modification. One example of a hierarchical promotion model is Software Configuration and Library Manager (SCLM), which is available from International Business Machines Corporation (IBM). "ISPF/PDF SCLM Guide and Reference" is a publication available from IBM and may be ordered using technical news letter publication number: SC34-4254.

The branching model provides the features of allowing recovery of any revision and concurrent development of revisions. On the other hand, the hierarchical promotion model does not provide for these features. However, the hierarchical promotion model provides for searching paths for revisions, alerting or preventing concurrent developments, preventing promotions that lose data, easy modification of development processes, ensuring only one revision of a object is within a group, enforces promotion paths, and automatically relabels revisions upon modification. Although the two models provide similar functions, each model provides features not available from the other. As a result, users choosing one model over another model will have to forego the use of features offered by the model not chosen.

It would therefore be desirable to have a library management system that provides beneficial features from both of the described models.

SUMMARY OF THE INVENTION

It is therefore one object of the present invention to provide an improved data processing system.

It is another object of the present invention to provide an improved method and system for managing objects.

It is yet another object of the present invention to provide an improved method and system for controlling various revisions of objects.

The foregoing objects are achieved as is now described. The present invention provides a method and system for maintaining revision control of a set of objects within a data processing system, wherein the set of objects are linearly interrelated, such that a subsequent object is related to a preceding object. Each object is created within a hierarchial promotion structure having a number of levels. A first database is created, which includes data identifying the linear interrelation between objects within the set of objects. The data includes a revision identifier associated with each set of objects. A status indicator is associated with each object within the hierarchial promotion structure, wherein a user may access the set of objects utilizing a revision identifier or hierarchial promotion structure indicator.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a block diagram illustrating an example of a branching model known in the prior art;

FIG. 2 is a block diagram illustrating an example of a hierarchical promotion model known in the prior art;

DETAILED DESCRIPTION OF PREFERRED EMBODIMENT

Figure 3:
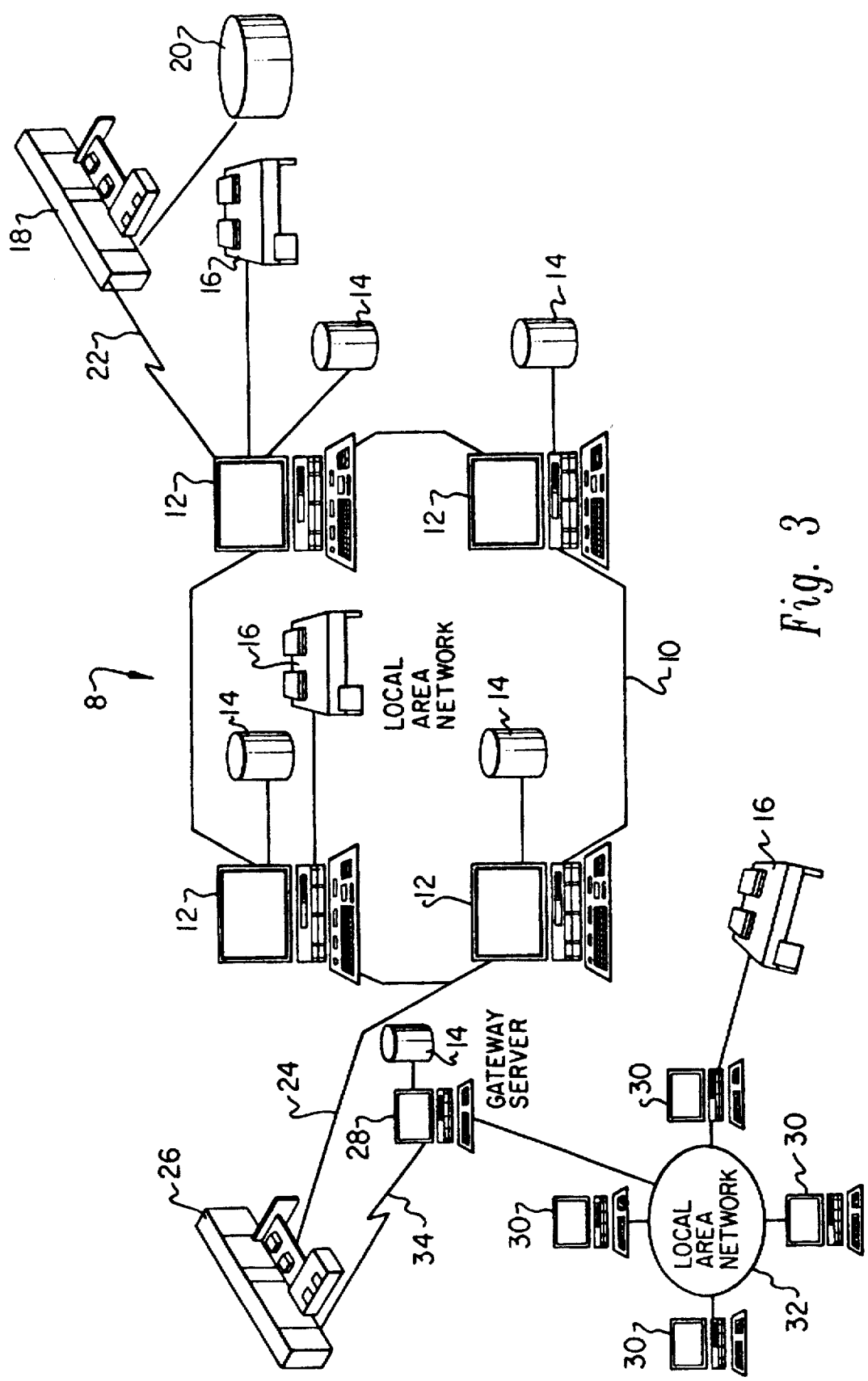
FIG. 3 is a pictorial representation of a data processing system which may be utilized to implement the method and system of the present invention.

With reference now to the figures, and in particular with reference to FIG. 3, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12 and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation. "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 3, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

As is known to those skilled in the art, a revision control system for a data processing system such as that described in the present invention is implemented with computer readable code, also known as software. The flowcharts of FIGS. 10–16 describe logical processes carried out by software implementing the present invention. Software program code which implements the present invention is typically stored in memory of some type within the computing environment. The software program code may be embodied on any of a variety of known media for use with the data processing system, such as a diskette or CD-ROM. The program code may be distributed on such media, or may be distributed to users from the memory of one computer system over a network to other computer systems for use by users of such other computer systems. Such techniques and methods for embodying software code on media and/or distributing the software code are well-known, and will not be discussed herein.

Figure 4A:
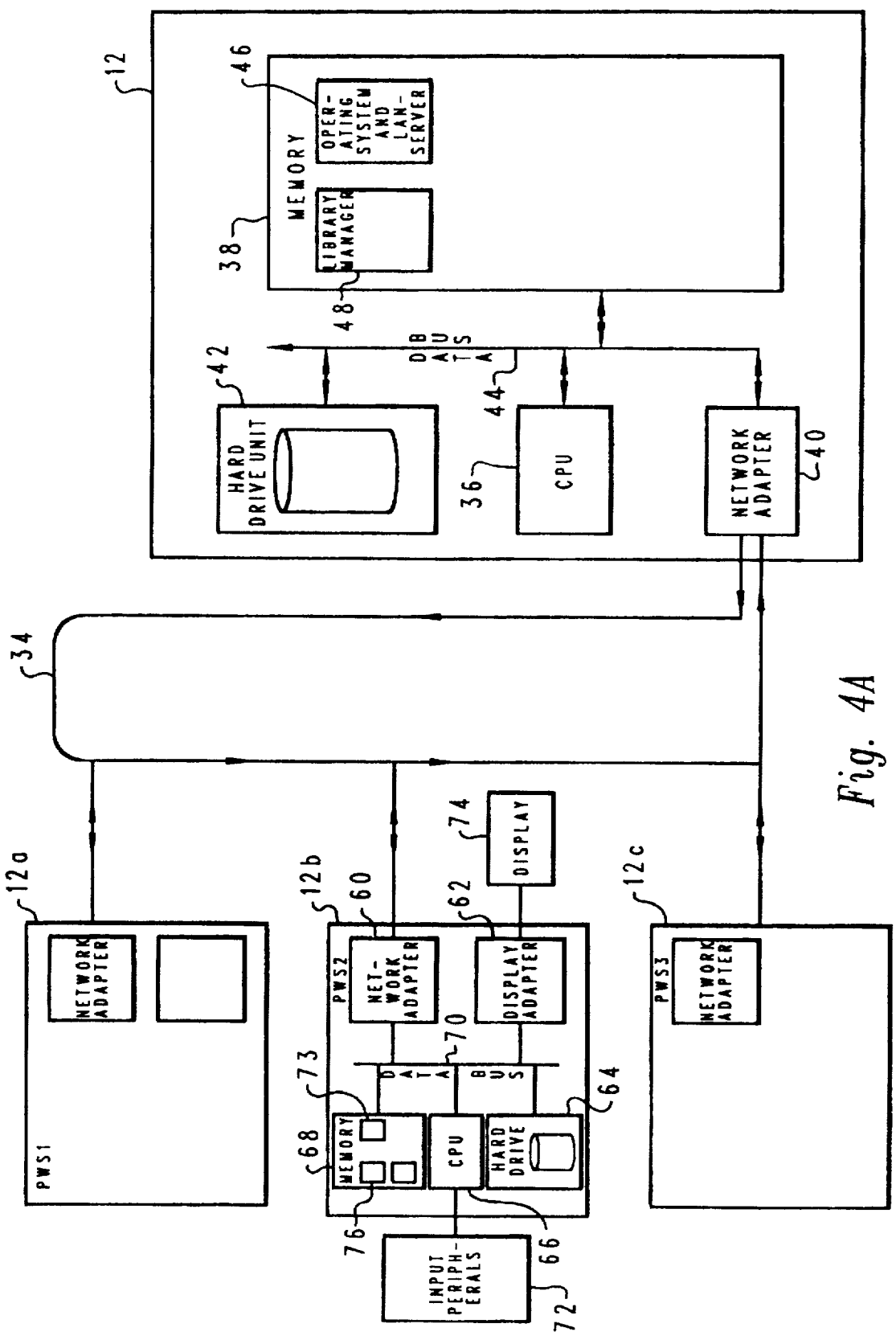
FIG. 4A depicts a block diagram of a Local Area Network from the data processing system illustrated in FIG. 3 for implementing the method and system of the present invention.

A preferred embodiment of the present invention may be incorporated within various computers depicted within data processing system 8. Referring now to FIG. 4A, a block diagram of LAN 10 is depicted for implementing a method and system of the present invention. Server 12 communicates with computers 12a–12c over communications channel 34. LAN 10 is depicted in a token ring geometry, however, other geometries are possible. Server 12 may be a conventional computer, such as an IBM PS/2 or AS/400 system programmed to practice this invention. Server 12 includes a central processing unit (CPU) 36, a memory 38, and a network adapter 40. Network adapter 40 is utilized for formatting outgoing transmissions and for deformatting incoming transmissions. Server 12 also includes a hard drive unit 42 for storing various revisions of objects pending a request for access by one or more users. Such a request results in the transfer of a revision of an object to computer memory 38 over data bus 44. A number of objects may exist within memory 38. An operating system and local area network server 46 are represented as one object within memory 38.

Various users may access revisions by sending a request to library manager 48 utilizing computers 12a–12c. Computer 12b is a typical example. Computer 12b operates as a personal workstation communicating with server 12. Schematically, computer 12b is substantially similar to server 12, and includes a network adapter 60, a display adapter 62, a hard drive unit 64, a central processing unit (CPU) 66, and addressable memory 68. Components of computer 12b transfer data over data bus 70. CPU 66 directly controls input peripherals 72, which may include a keyboard and a mouse. Display adapter 62 drives display device 74. Memory 68 includes operating system 73. Memory 68 also includes revision 76, which was supplied by computer 12 in response to a request to library manager 48. Additionally, computer 12b also may have a library manager (not shown) in memory 68 in accordance with a preferred embodiment of the present invention.

Figure 4B:
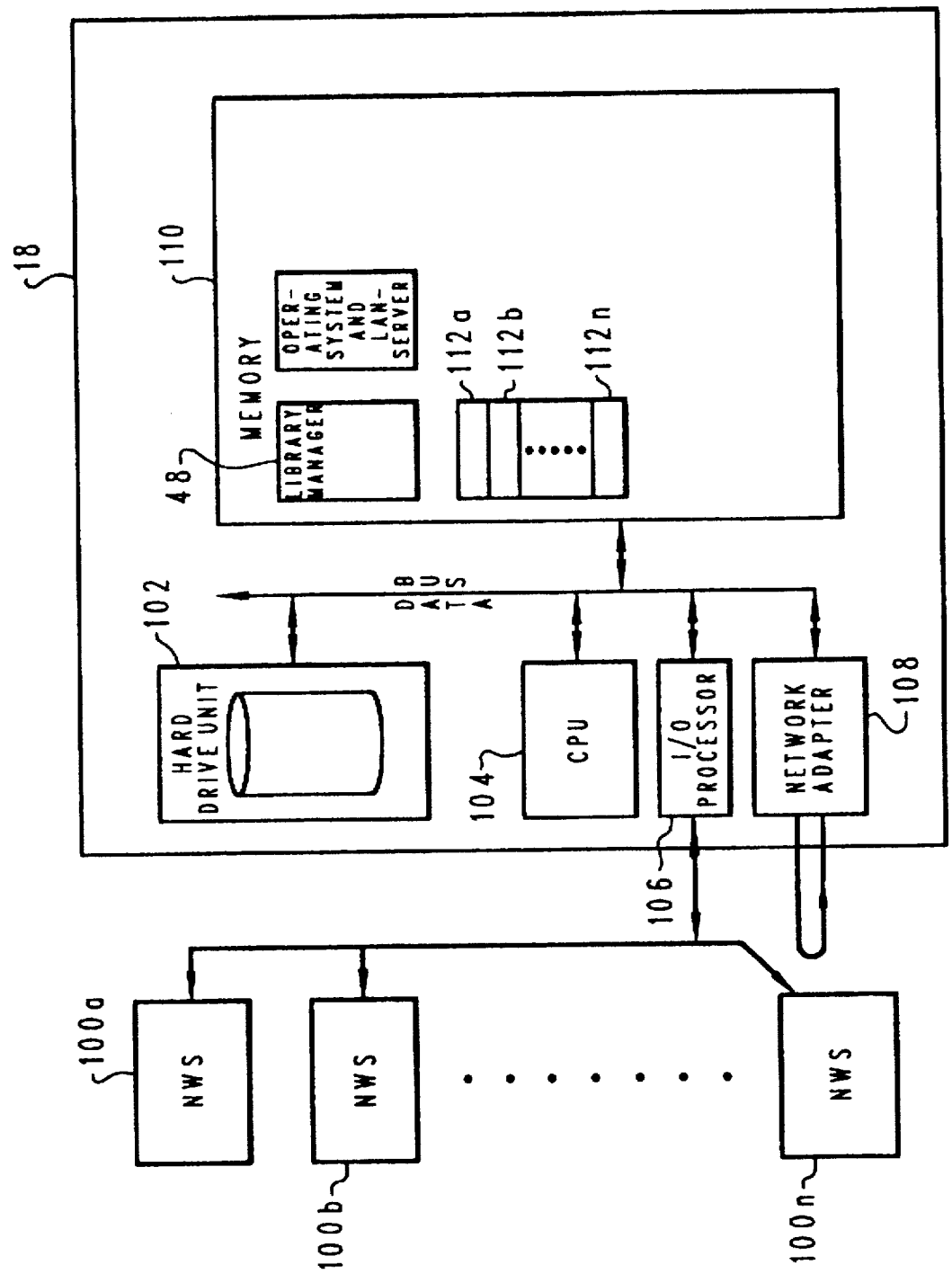
FIG. 4B depicts a block diagram of a mainframe computer from FIG. 3 for implementing the method and system of the present invention.

Referring now to FIG. 4B, a block diagram of mainframe computer 18 is depicted in accordance with a preferred embodiment of the present invention. Mainframe computer 18 is a single computer system running multiple processes, such as an IBM ESA/370 or ESA/390 attached to multiple nonprogrammable work stations (NWS) 100a–100n. Mainframe computer 18 includes a hard drive unit 102, CPU 104, input/output (I/O) processor 106 for communicating with nonprogrammable work stations 100a–100n, network adapter 108, and memory 110. Hard drive unit 102 may contain revisions managed by library manager 48 located in memory 110. Each nonprogrammable work station may access a revision located within memory 110. For example, nonprogrammable work station 100a would access revision 112a, nonprogrammable work station 100b would access revision 112b, and nonprogrammable work station 100n would access revision 112n in accordance with a preferred embodiment of the present invention.

Figure 5:
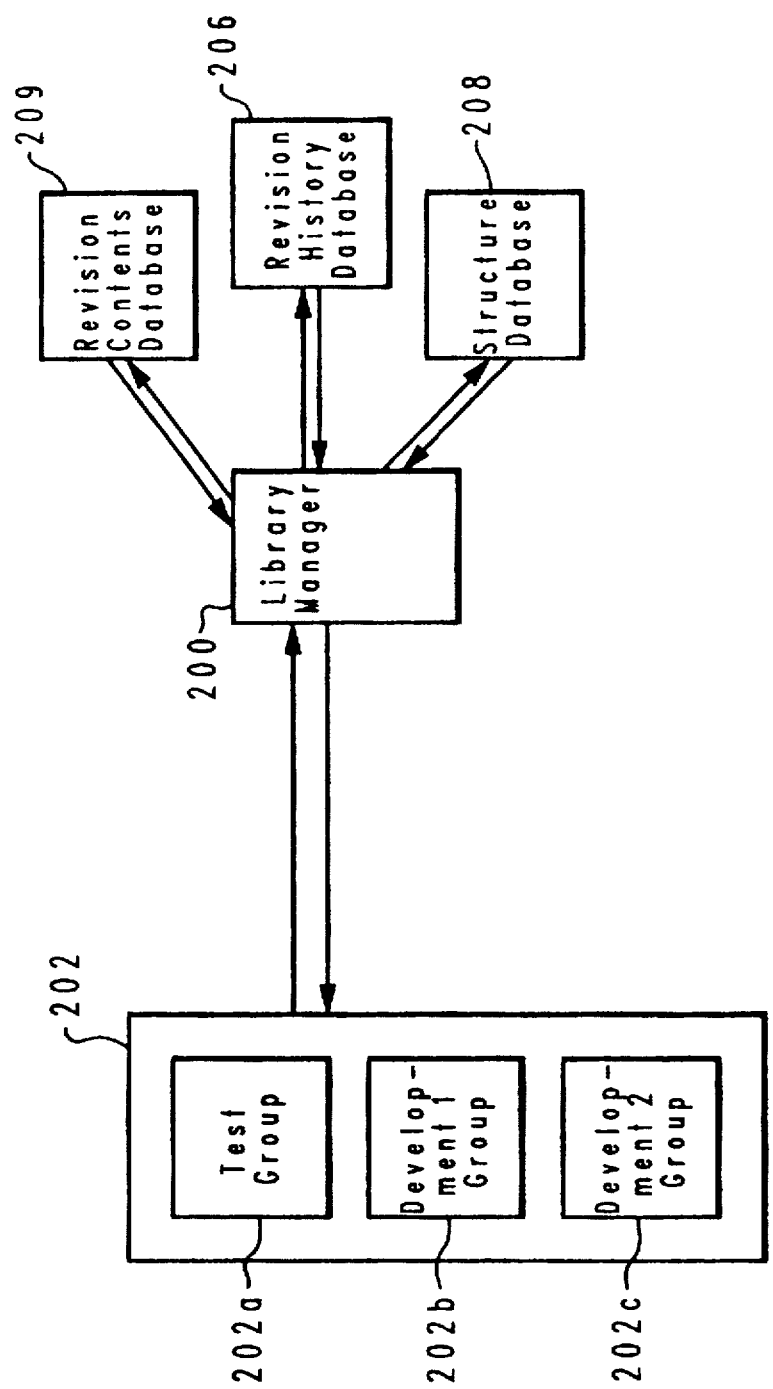
FIG. 5 is a block diagram illustrating a library management system provided in accordance with a preferred embodiment of the present invention.

Referring now to FIG. 5, a block diagram illustrating a library management system is depicted in accordance with a preferred embodiment of the present invention. Library manager 200 performs various functions in response to requests from users 202. Users 202 may be divided into groups 204a–204c although any user may use another group in accordance with a preferred embodiment of the present invention. The library management system also includes a revision history database 206, a revision contents database 209 and a structure database 208 in accordance with a preferred embodiment of the present invention. Revision history database 206 may include derivational history of the objects and the revisions themselves are located in revision contents database 209 in accordance with a preferred embodiment of the present invention. Structure database 208 contains the information organizing the groups into a hierarchical promotion structure in accordance with a preferred embodiment of the present invention.

Figure 6:
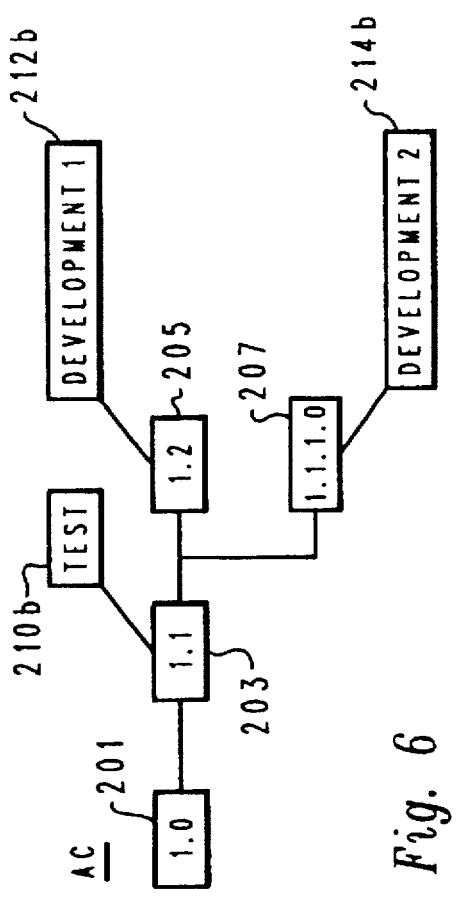
FIG. 6 depicts a block diagram illustrating a revision database provided in accordance with a preferred embodiment of the present invention.

Referring now to FIG. 6, a block diagram illustrating a revision database is depicted in accordance with a preferred embodiment of the present invention. In this example, revision history database 206 contains one object having revisions 1.0, 1.1, 1.1.1.0, and 1.2, as depicted in blocks 201, 203, and 205 and 207. The contents or data for the revision are stored in revision contents database 209 in accordance with a preferred embodiment of the present invention. Alternatively, the revision history database 206 and revision contents database 209 may be combined into a single database. Revision 1.0 is the primary revision with revision 1.1 being created from modifications to revision 1.0. Revision 1.2 is a result of a modification of revision 1.1. Similarly, revision 1.1.1.0 resulted from a modification or change to revision 1.1. In accordance with a preferred embodiment of the present invention, status labels may be utilized to identify various revisions. For example, revision 1.1 is labeled TEST, depicted in block 210b, revision 1.2 is labeled DEVELOPMENT 1, illustrated in block 212b, and revision 1.1.1.0 is labeled DEVELOPMENT 2, shown in block 214b. Status labels will be described in more detail below. The revision names and their relations to other revisions may be stored in a database separate from the actual files containing the data constituting the revisions. Retrieval of data comprising a revision based on the revision name is well known to those skilled in the art.

Figure 7:
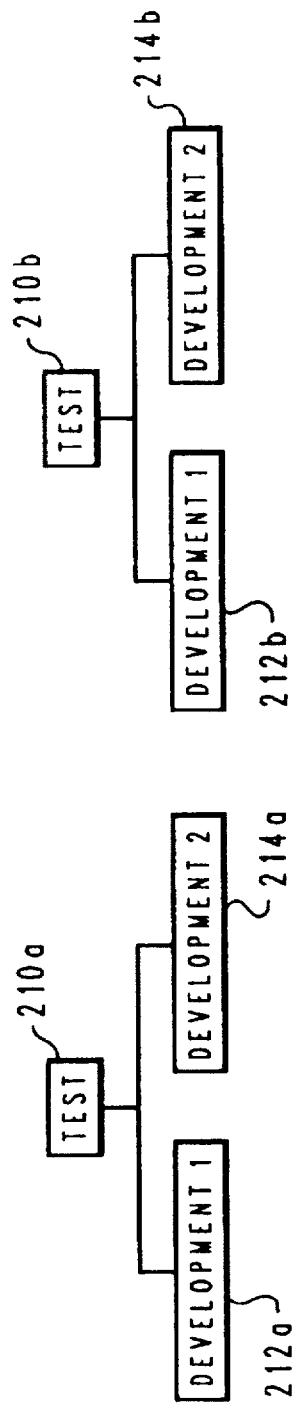
FIG. 7 is a block diagram illustrating a structure database provided in accordance with a preferred embodiment of the present invention.

Referring now to FIG. 7, a block diagram illustrating a structure database is depicted in accordance with a preferred embodiment of the present invention. In structure data base 208, the structure database is organized in a hierarchical promotion structure in accordance with a preferred embodiment of the present invention. The structure database includes data illustrating the hierarchical promotion structure for the various groups and includes status labels, which are associated with each other in a structure corresponding to the groups that they are assigned to. No two revisions for a single object may have the same status label. This requirement ensures only a single revision for an object may be in a group.

The structure database, in this example, includes group 210a, which is called "TEST"; group 212a, which is called "DEVELOPMENT 1"; and group 214a, which is called "DEVELOPMENT 2". Groups 212a and 214a are assigned to programmers that develop and modify software for a commercial product in accordance with a preferred embodiment of the present invention. Associated with these groups are status labels, which are associated with each other in a structure similar to the groups. Status label 210b "TEST" corresponds to group 210a; status label 212b "DEVELOPMENT 1" corresponds to group 212a; and status label 214b "DEVELOPMENT 2" is associated with group 214a. The status labels may be associated with revisions as shown in FIG. 6. Status label 210b is associated with revision 1.1 in FIG. 6. Status label 212b is associated with revision 1.2, while status label 214b is associated with revision 1.1.1.0 in FIG. 6.

The association of status labels with revisions within FIG. 6 is not static. The associations between revisions and status labels may be altered by checkouts, checking, draw downs or promotions within the hierarchical promotion structure set up in the structure database depicted in FIG. 7. For example, if group 212 finishes modifications to revision 1.2 and promotes that revision to group 210, status label 210b will be reassigned from revision 1.1 to revision 1.2. Group 212a will no longer have its status label 212b assigned to a revision until a user makes a request to check out an object or create a new object in group 212a. A user may view revision 1.1 by specifying the TEST label. Similarly, revisions 1.2 and 1.1.1.0 may be viewed by specifying labels DEVELOPMENT 1 and DEVELOPMENT 2.

The promotion of labels follows that of the hierarchical promotion model in accordance with a preferred embodiment of the present invention. Revisions associated with label 212b or label 214b may be promoted to label 210b. Again as mentioned before, promotion down the scheme may not occur. Although the depicted embodiment illustrates only two levels for status labels in groups, a multitude of different levels and numbers of groups and status labels within a level may be easily defined by those skilled in the art.

Figure 8:
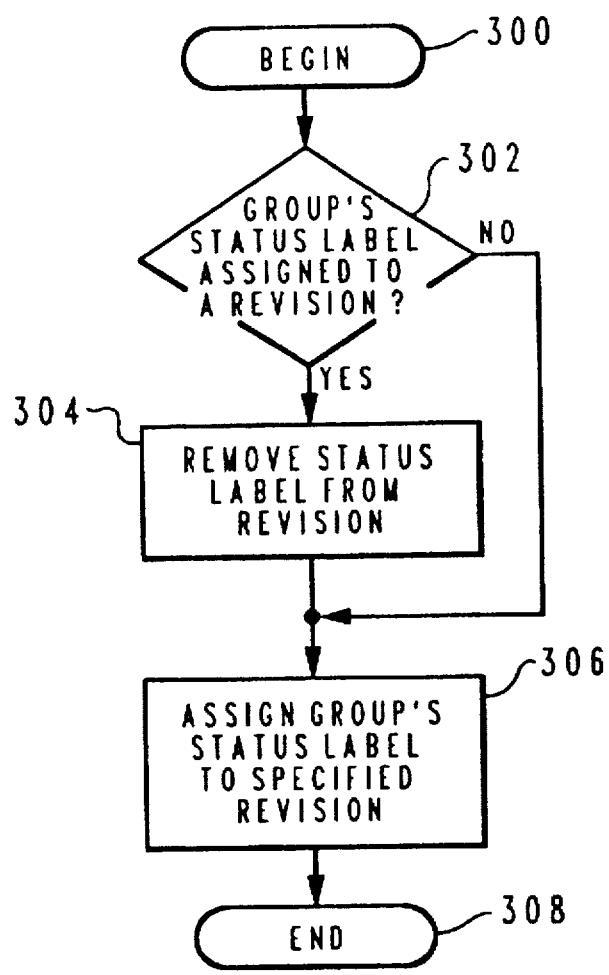
FIG. 8 depicts a method and system for placing a revision in a group in accordance with a preferred embodiment of the present invention.

Referring now to FIG. 8, a method and system for placing a revision in a group is depicted in accordance with a preferred embodiment of the present invention. The user in a group may specify the revision that the user desires to place into the group, or the placement process may be an internal subroutine. The process begins as illustrated in block 300 and thereafter proceeds to block 302. Block 302 depicts a determination of whether or not the group's status label is assigned to a revision. If the group's status label is assigned to a revision, the process then advances to block 304, which illustrates the removal of the status label from that revision. Thereafter, the process proceeds to block 306. Assignment of the group's status label to the specified revision is depicted in block 306. Thereafter, the process completes in block 308. Referring back to block 302, if the group's status label is not assigned to a revision, the process proceeds directly to block 306 for assignment of the group's status label to the specified revision.

A "hierarchical search" is a series of searches, wherein each search is for a specific status label. Status labels correspond to groups encountered as searching is performed up the promote path of the hierarchical promote structure. The first status label encountered corresponds to the specified group; the second status label corresponds to the parent group of the specified group. The next status label corresponds to the parent group of the parent group of the specified group. A search ends in accordance with a preferred embodiment of the present invention when (1) a search for a status label finds a revision with that status label (the search ends successfully and returns the revision's identification) or (2) a status label whose corresponding group has no parent is encountered (the search ends unsuccessfully and no revision identification is returned).

Figure 9:
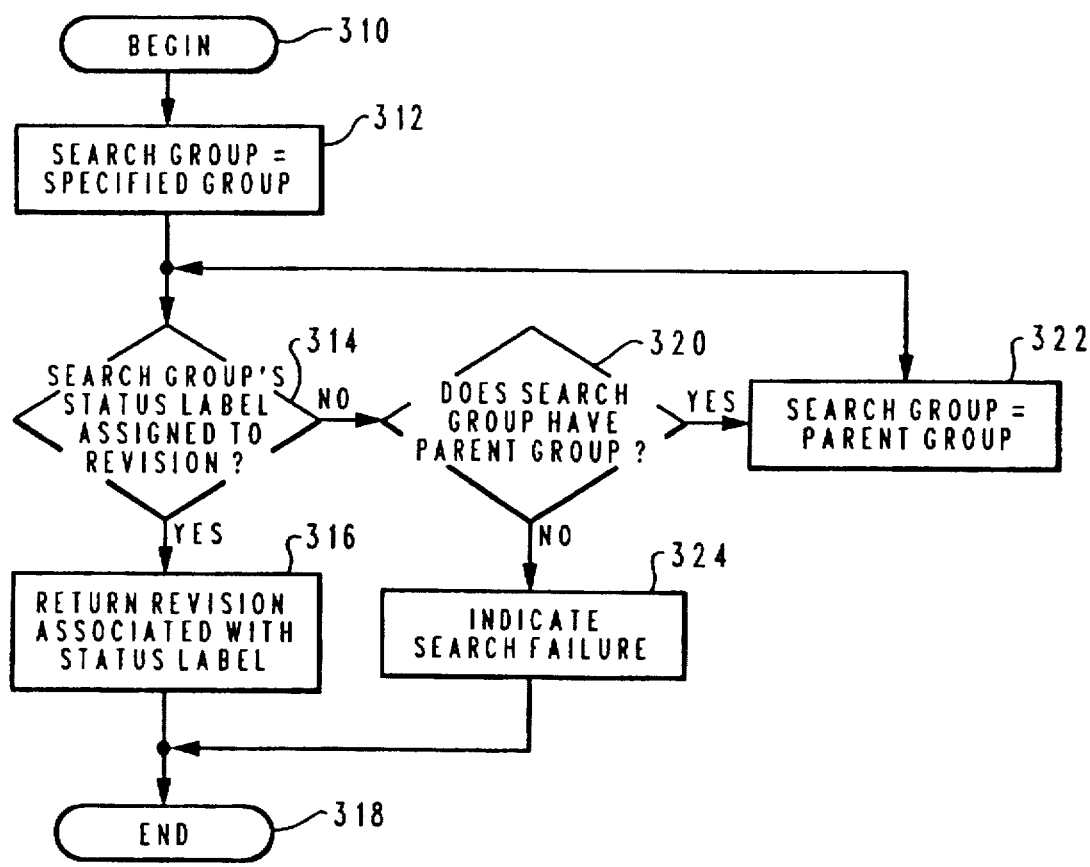
FIG. 9 depicts a method and system for performing a hierarchical search for a revision in a group in accordance with a preferred embodiment of the present invention.

Referring now to FIG. 9, a method and system for performing a hierarchical search for a revision in a group is depicted in accordance with a preferred embodiment of the present invention. The search is performed in revision history database 206 depicted in FIG. 5. The user may specify the status label associated with the group at which searching is to begin and the revision to be searched for. The process begins in block 310 and thereafter proceeds to block 312, which illustrates setting the search group equal to the specified group. Thereafter, the process proceeds to block 314. Block 314 depicts a determination of whether or not the search group's status label is currently assigned to a revision of the object. If the search group's status label is currently assigned to a revision of the object, the process then proceeds to block 316. Block 316 illustrates returning the revision associated with the status label. Thereafter, the process terminates in block 318 as depicted.

Referring back to block 314, if the search group's status label is not currently assigned to a revision of the object, the process then proceeds to block 320. Block 320 illustrates a determination of whether or not the search group has a parent group. If the search group has a parent group, the process then proceeds to block 322, which depicts setting the search group equal to the parent group for further searching. Thereafter, the process returns to block 314.

Referring back to block 320, if the search group does not have a parent group, the process then advances to block 324, which illustrates an indicating that the search has failed.

Figure 10:
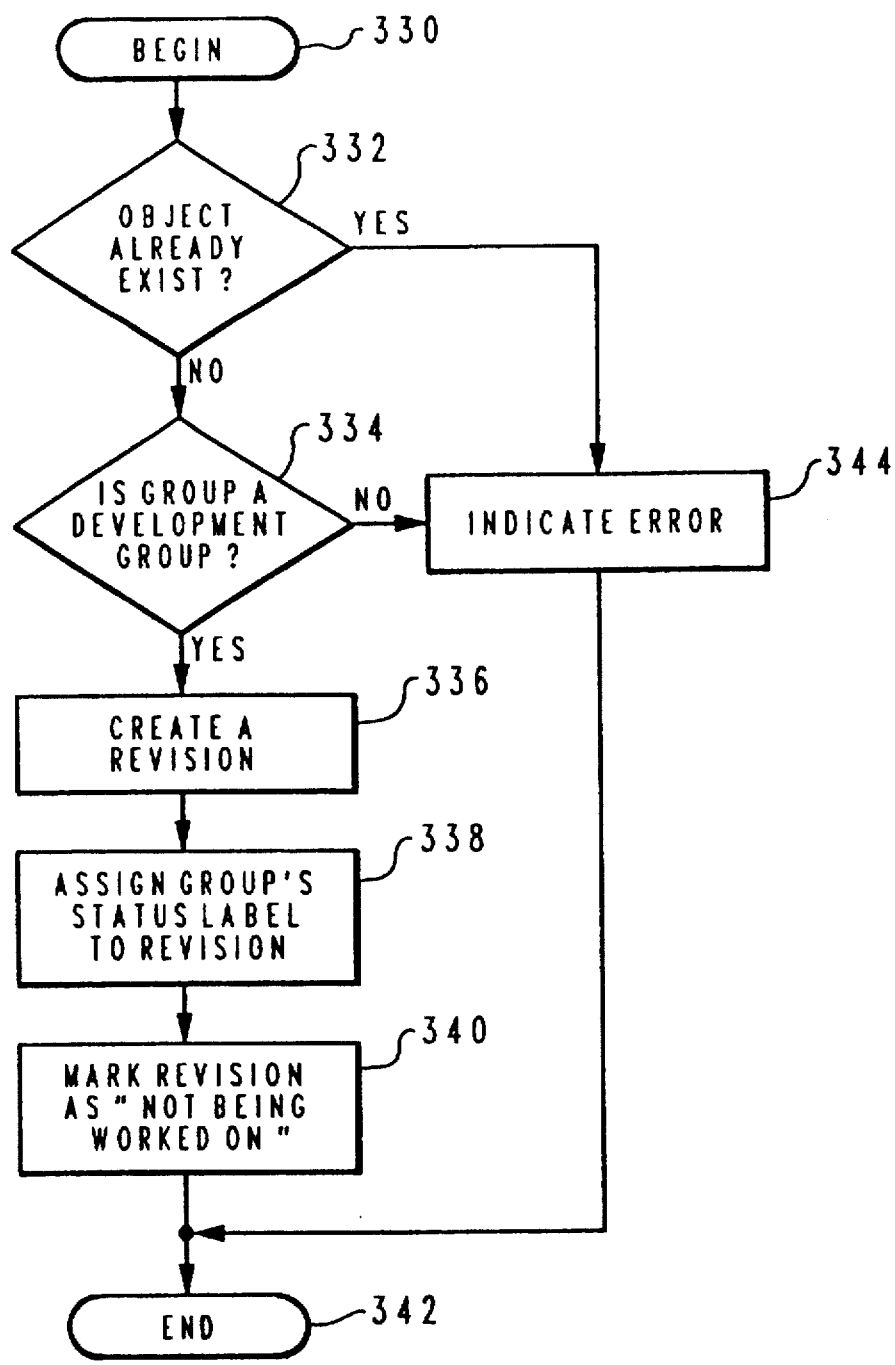
FIG. 10 depicts a high level logic flowchart illustrating a method and system for creating a object at a group in accordance with a preferred embodiment of the present invention.

The "create function" causes a special revision, also called a "primary revision", to be created. All future revisions of the object may be treated as descendants of this primary revision. An object may be created at some group in the promotion hierarchy, and the primary revision is labeled with the status label corresponding to that group. Referring now to FIG. 10, a flowchart illustrating a method and system for creating an object at a group is depicted in accordance with a preferred embodiment of the present invention.

The process begins as depicted in block 330 and thereafter proceeds to block 332. Block 332 illustrates a determination of whether or not the object specified by the user already exists. If an object does not already exist, the process then advances to block 334, which depicts a determination of whether not the group is a development group. A development group is a group into which no other group promotes. If the group is a development group, the creation of a primary revision with no data is performed in block 336. The process then advances to block 338, which depicts the assignment of the group's label to the new revision. Thereafter, the process advances to block 340. Block 340 illustrates the marking of the new revision as not being worked on by somebody. The process thereafter completes as illustrated in block 342.

Referring back to block 332, if the object specified already exists, the process then proceeds to block 344, which illustrates indicating that an error has occurred in processing. Similarly, if the group is not a development group in block 334, the process also advances to block 344 for an indication of an error in processing. In accordance with a preferred embodiment of the present invention, other criteria may be utilized within block 334 to determine whether an object may be created. For example, other groups other than a development group may be allowed to create objects in accordance with a preferred embodiment of the present invention. Alternatively, any group may be allowed to create objects.

Figure 11:
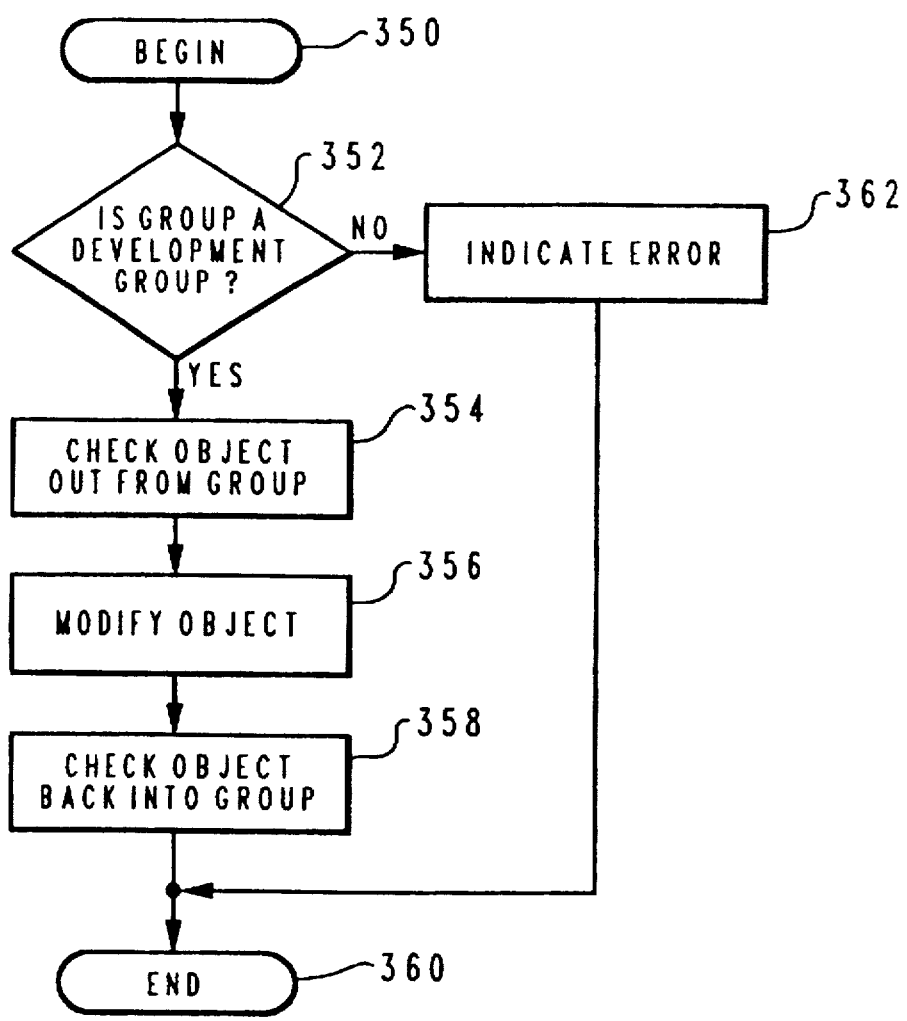
FIG. 11 is a high level logic flowchart of a method and system for modifying an object in a group in accordance with a preferred embodiment of the present invention.

When a revision is modified, a new revision is created and is based on the old revision. If the old revision had a status label assigned to it, the label is moved from the old revision and reassigned to the new revision. Referring now to FIG. 11, a flowchart of a method and system for modifying an object in a group is depicted in accordance with a preferred embodiment of the present invention. The process begins at block 350 and thereafter proceeds to block 352, which depicts a determination of whether or not the group is a development group. If the group is a development group, the process then advances to block 354. Block 354 illustrates the checking out of an object from the group. The object created by the check out is modified as depicted in block 356 and thereafter the object is checked back into the group as illustrated in block 358. The process thereafter terminates as depicted in block 360. Referring back to block 352, if the group is not a development group, the process then proceeds to block 362, which depicts the indication of the occurrence of an error. The process again terminates in block 360 thereafter. As stated before, other criteria may be utilized in accordance with a preferred embodiment of the present invention in block 352.

Figure 12:
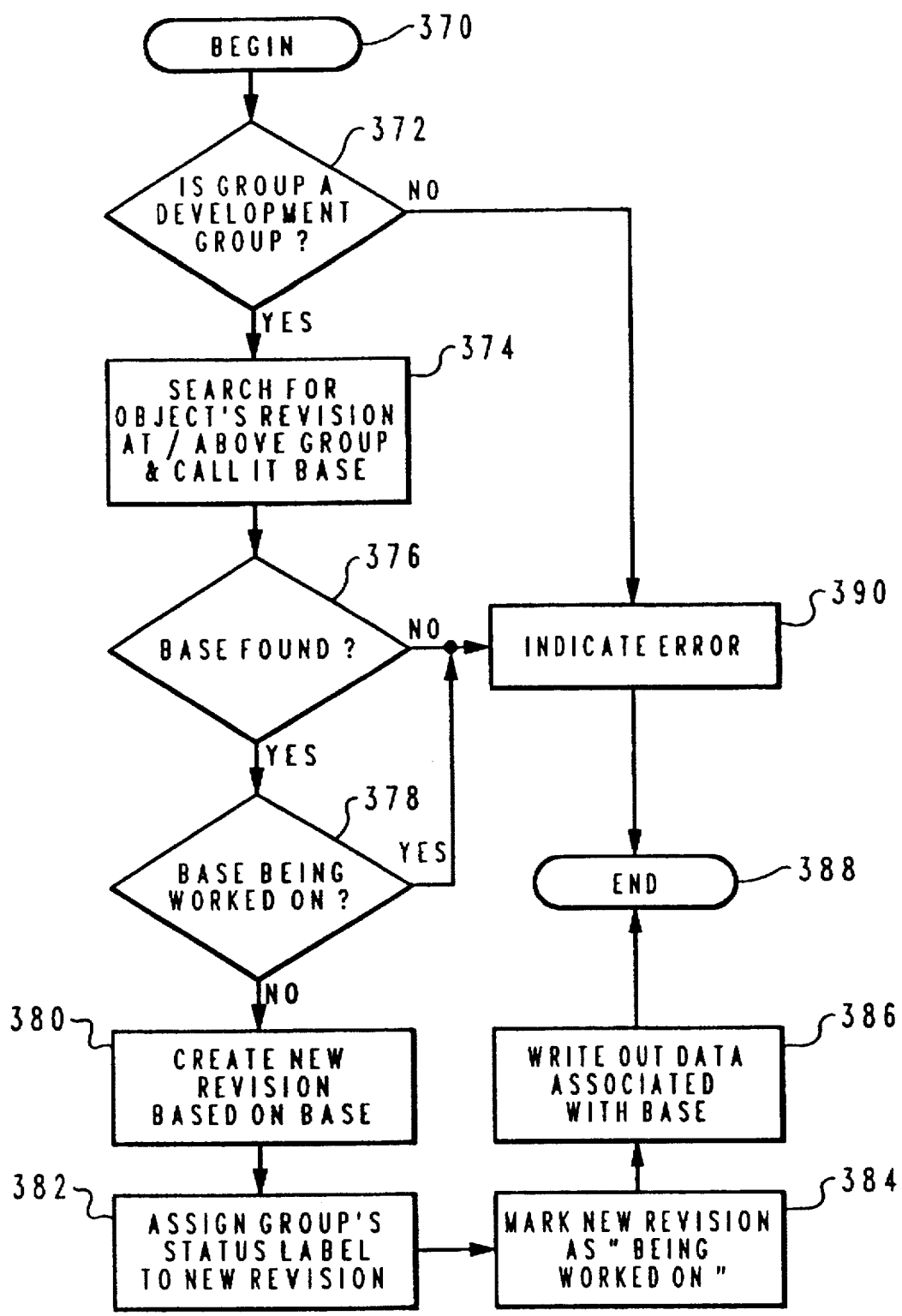
FIG. 12 is a high level logic flowchart illustrating a method and system for checking out an object from a group in accordance with a preferred embodiment of the present invention.

A user in a group may merely select an object without having to specify a particular revision. The correct revision within the hierarchical promotion structure is found based on the user specifying the status label for his or her group in accordance with a preferred embodiment of the present invention. Referring now to FIG. 12 a flowchart illustrating a method and system for checking out an object from a group is depicted in accordance with a preferred embodiment of the present invention. The process begins as illustrated in block 370 and thereafter proceeds to block 372, which illustrates a determination of whether or not the group requesting a check out is a development group. As mentioned above, the data associated with a revision name may be stored in a data separate from the revision database containing the revision names. If the group is a development group, the process then advances to block 374. Block 374 illustrates searching for the object's revision at or above the group level in the hierarchy. This revision is called the "base".

A determination of whether or not the search found a base is depicted in block 376. Upon finding a base, a determination is made as to whether or not somebody is already working on the base as illustrated in block 378. If no one is already working on the base, the process then advances to block 380, which depicts the creation of a new revision based on the base. Afterward, the process proceeds to block 382. Block 382 illustrates the assignment of the status label for the group to the new revision. The new revision is then marked as being worked on by somebody in block 384. Thereafter, the process advances to block 386, which depicts the writing out of the data associated with the base revision. The data for a revision is written into revision contents database 206, illustrated in FIG. 5 in accordance with a preferred embodiment of the present invention. Thereafter, the process terminates as illustrated in block 388. Data associated with a revision is stored in the process of writing out the data associated with the base revision in revision contents database 206.

Referring again to block 376, if a base is not found, the process then proceeds to block 390, which depicts an indication of the occurrence of an error in processing. Thereafter, the process terminates in block 388. With reference again to block 378, if the base is being worked on, the process then proceeds to block 390 and an error is indicated. Thereafter, the process again terminates in block 388. Referring back to block 372, if the group is not a development group, the process then proceeds to block 390, which depicts an indication of the occurrence of an error in processing. Thereafter, the process again terminates in block 388.

Figure 13:
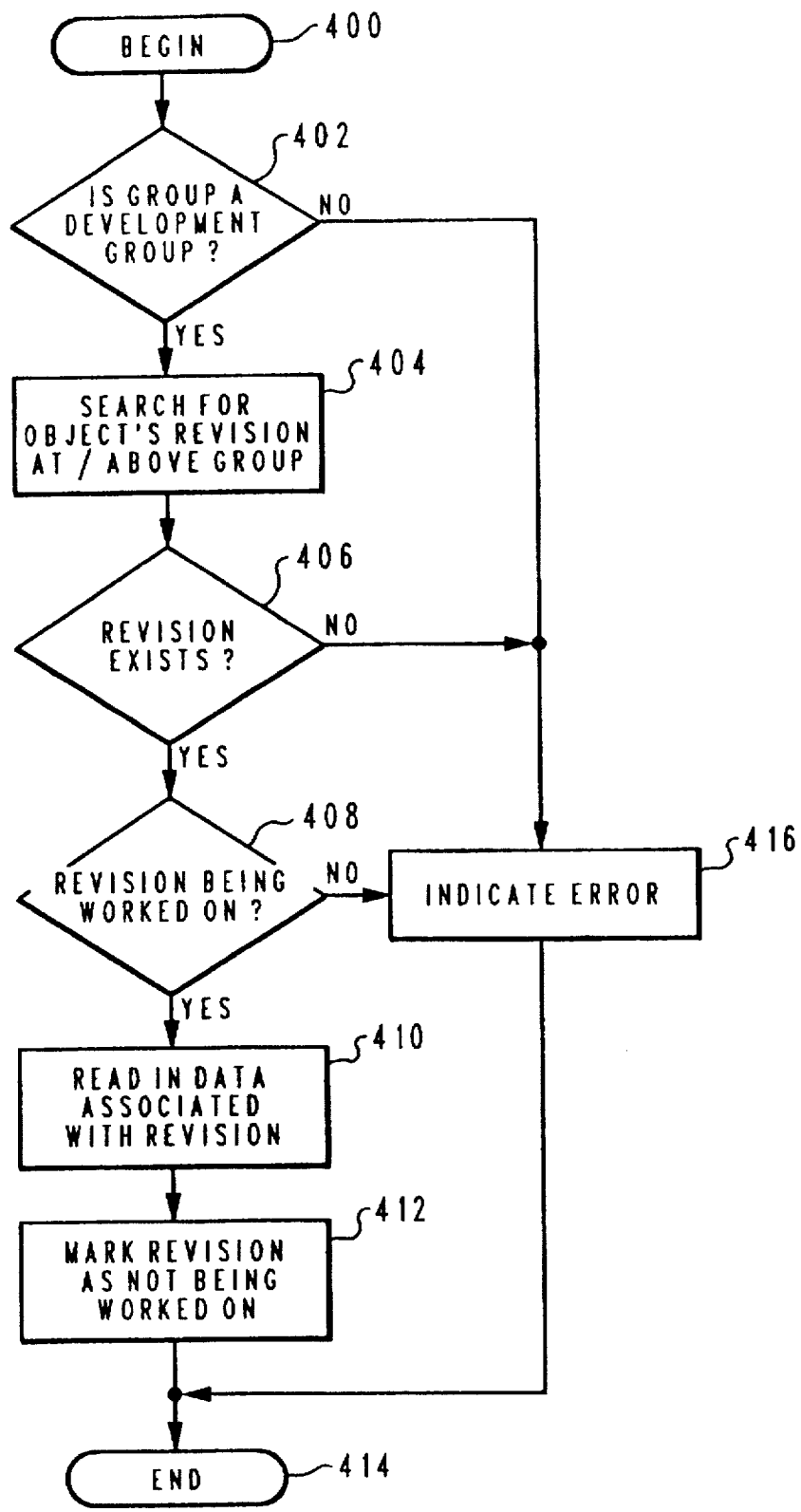
FIG. 13 depicts a high level logic flowchart illustrating a method and system for checking an object into a group in accordance with a preferred embodiment of the present invention.

With reference now to FIG. 13, a flowchart illustrating a method and system for checking an object into a group is depicted in accordance with a preferred embodiment of the present invention. The process begins as illustrated in block 400 and thereafter proceeds to block 402, which depicts a determination of whether or not the group is a development group. As stated before, other criteria may be utilized in accordance with a preferred embodiment of the present invention in block 402. If the group is a development group, the process then advances to block 404. Block 404 illustrates searching for the object's revision at or above the group level in the hierarchical structure. Next, a determination of whether or not such a revision exists is illustrated in block 406. Afterward, a determination of whether or not somebody is working on the revision is made in block 408. If the revision is not being worked on, the process advances to block 410. Block 410 depicts the reading in the data to be associated with the revision. Data is read is from revision contents database 206, depicted in FIG. 5 in accordance with a preferred embodiment of the present invention. The mechanisms for reading in data associated with a revision are well known to those skilled in the art. The process then proceeds to block 412, which illustrates the marking of the new revision as not being "worked on". Afterward, the process terminates as depicted in block 414.

Referring back to block 402, if the group is not a development group an indication that an error has occurred is made in block 416. The process also proceeds to block 416 from block 406 if a revision does not exist. Furthermore, the process advances to block 416 if, in block 408, a determination is made that the revision is not being worked on.

"Promote" is an action that modifies the label assigned to existing revisions. A revision may be promoted from one group to another along the hierarchical promote structure. No new revisions need to be created as a result of a "promote". Two status labels may be effected by a promote. A "from label" exists corresponding to the group from which the object is to be promoted (called the "from" group) and a "to" label exist corresponding to the group to which the object will be promoted to (called the "to" group). The "promote to" group is always the parent of the "promote from" group in accordance with a preferred embodiment of the present invention. In promoting an object, the revision having the "from" label is located and the "from" label is removed. This revision is then assigned the "to" label. If the "to" label is already assigned to another revision, then it must be first removed from that other revision.

Figure 14:
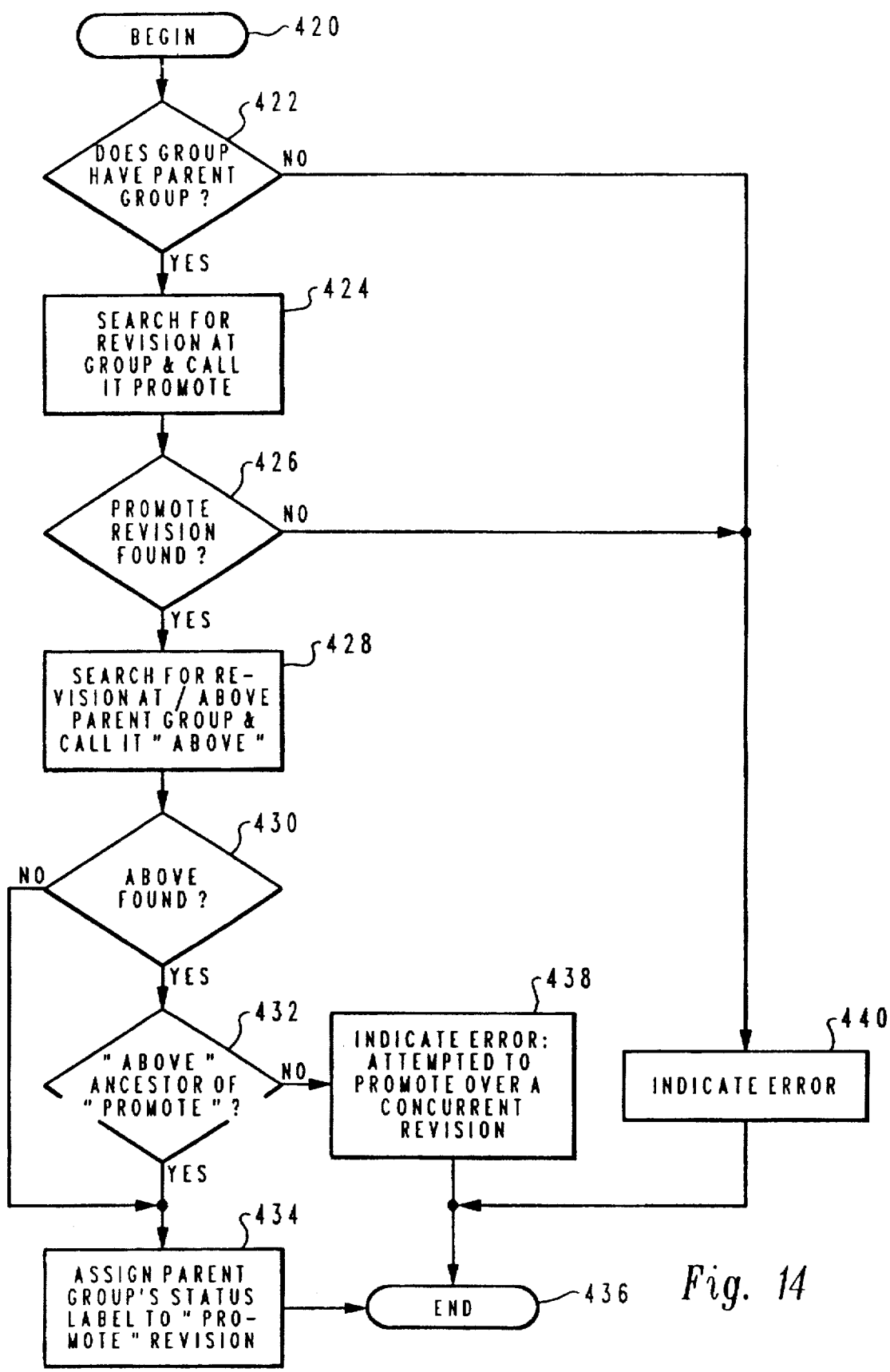
FIG. 14 is a high level logic flowchart illustrating a method and system for promoting an object from a group in accordance with a preferred embodiment of the present invention.

Referring now to FIG. 14, a flowchart illustrating a method and system for promoting an object from one group to another group is depicted in accordance with a preferred embodiment of the present invention. As illustrated, the process begins in block 420 and thereafter proceeds to block 422, which depicts a determination of whether or not the group has a parent group. If the group has a parent group, a search is performed to find the object's revision at the group, which is called "promote", as illustrated in block 424. Thereafter, a determination of whether or not the search found a revision is depicted in block 426. If a revision is found during the search, the process then advances to block 428. Block 428 illustrates searching for a revision of the object at or above the parent group. This revision is called the "above" revision.

A determination of whether or not an "above" revision is found is illustrated in block 430. If such a revision exists, the process then advances to block 432, which depicts a determination of whether or not "above" is an ancestor of "promote". "Above" is an ancestor of "promote" if "promote" is based on "above", or if one of the revisions "promote" is based on is an ancestor of "above" in the revision history database in accordance with a preferred embodiment of the present invention. If "above" is an ancestor of "promote", the process proceeds to block 434, which illustrates the assignment of the parent group's label to the "promote" revision. Thereafter, the process terminates as depicted in block 436.

Referring back to block 432, if "above" is not an ancestor of "promote", the process proceeds to block 438. Block 438 illustrates the indication of an error stating that an attempt to promote over a concurrent revision has occurred. Again, the process terminates in block 436. Referring back to block 430, if an "above" revision does not exist, the process proceeds directly to block 434 to assign the parent group's label to the "promote" revision.

Referring back to block 426, if the search does not find a revision, the process proceeds to block 440, which depicts the indication of the occurrence of an error in processing. Thereafter the process terminates in block 436. Referring back to block 422, if the group does not have a parent group, the process also proceeds to block 440 for an indication of an error.

Figure 15:
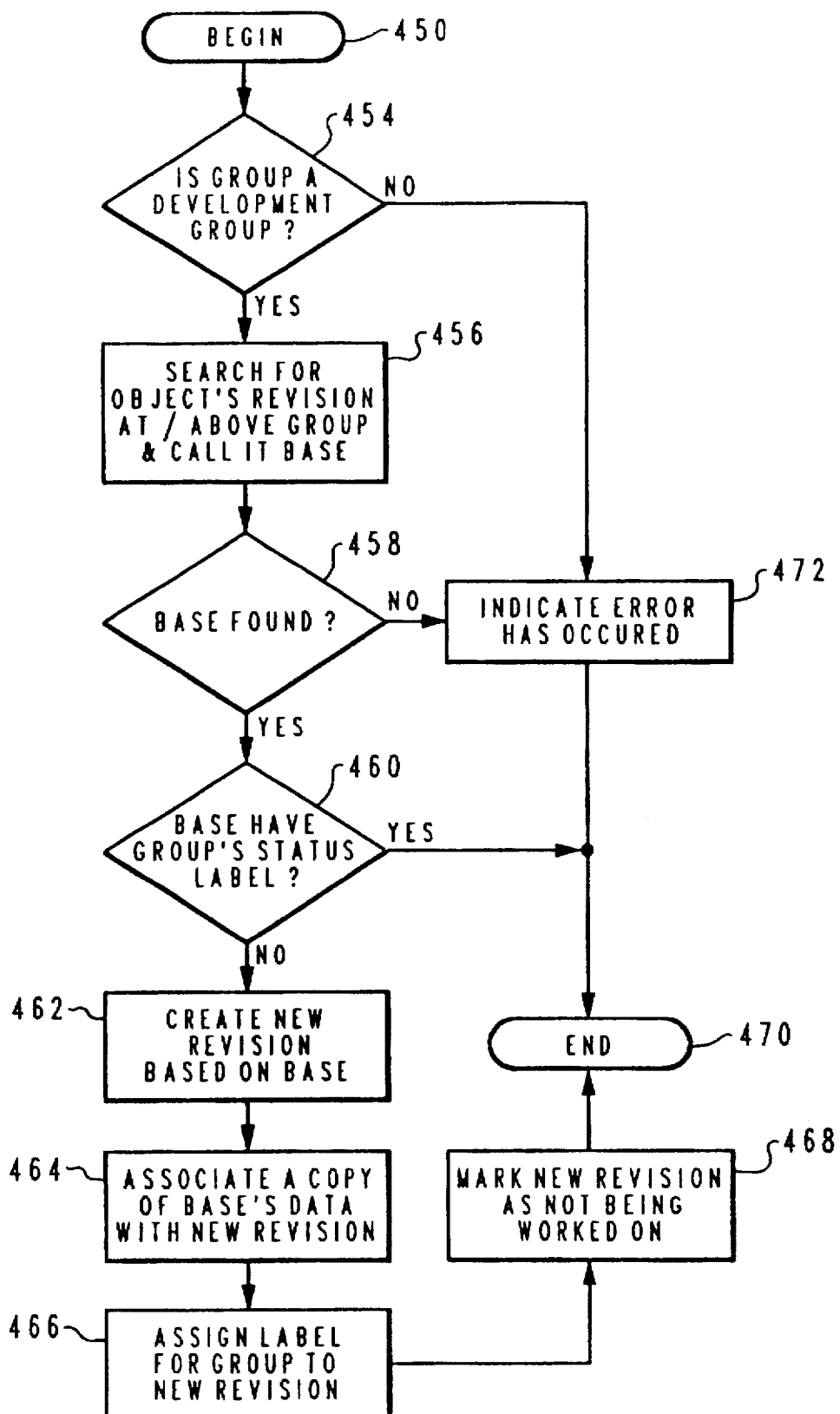
FIG. 15 depicts a high level logic flowchart illustrating a method and system for performing a draw down of an object to a group from another group in accordance with a preferred embodiment of the present invention.

Referring now to FIG. 15, a flowchart illustrating a method and system for performing a draw down of an object to a group from another group is depicted in accordance with a preferred embodiment of the present invention. A draw down is the creation of a new revision in a lower group by copying a revision from a group above the lower group. One of the reasons for drawing down or performing a draw down is to create a revision for modification. When an object is drawn down to a group, a hierarchical search is performed against that object. The search starts at the group to which a draw down is desired. A draw down fails if no revision is returned by the search. The draw down succeeds if the revision returned by the search is already at the group. Otherwise, a new revision is created and based on the revision returned by the search. This new revision is assigned the status label that corresponds to the specified group.

As illustrated, the process begins in block 450 and thereafter proceeds to block 454, which depicts a determination of whether or not the group is a development group. Thereafter, a search for the object's revision at or above the group as illustrated in block 456. This revision is called the "base" revision. A determination is made as to whether or not the search found a "base" revision as depicted in block 458. If a "base" revision is found, the process then advances to block 460, which illustrates a determination of whether or not the "base" revision already has the group's status label. If the "base" revision does not already have the group's status label, the process then advances to block 462, which depicts the creation of a new revision based on the "base" revision.

Next, a copy of the "base" revision's data is associated with the new revision as illustrated in block 464. Thereafter, the process proceeds to block 466, which depicts the assignment of the label for the group to the new revision. Thereafter, the process advances to block 468. Block 468 illustrates the marking of the new revision as not being "worked on". The process thereafter terminates as depicted in block 470. Referring back to block 454, if the group is not a development group, the process proceeds to block 472, which illustrates the occurrence of an error. As stated before, other criteria may be utilized in accordance with a preferred embodiment of the present invention in block 454. Additionally, the process proceeds to block 472 from block 458 if the search does not find a base. Again referring to block 460, the process proceeds directly to block 470 for completion if the base already has the group's status label.

Merger of two revisions of an object may be performed in accordance with a preferred embodiment of the present invention. Two hierarchical searches are performed for the object starting at each of the two groups. The data for the revisions found by the searches may be merged via a merge utility well known to those skilled in the art to create a new revision of the object. This new revision will be based on each of the two source revisions and will be assigned the status label corresponding to a third group in accordance with a preferred embodiment of the present invention. Additionally, the present invention prevents the loss of modifications from parallel or concurrent revisions.

Figure 16:
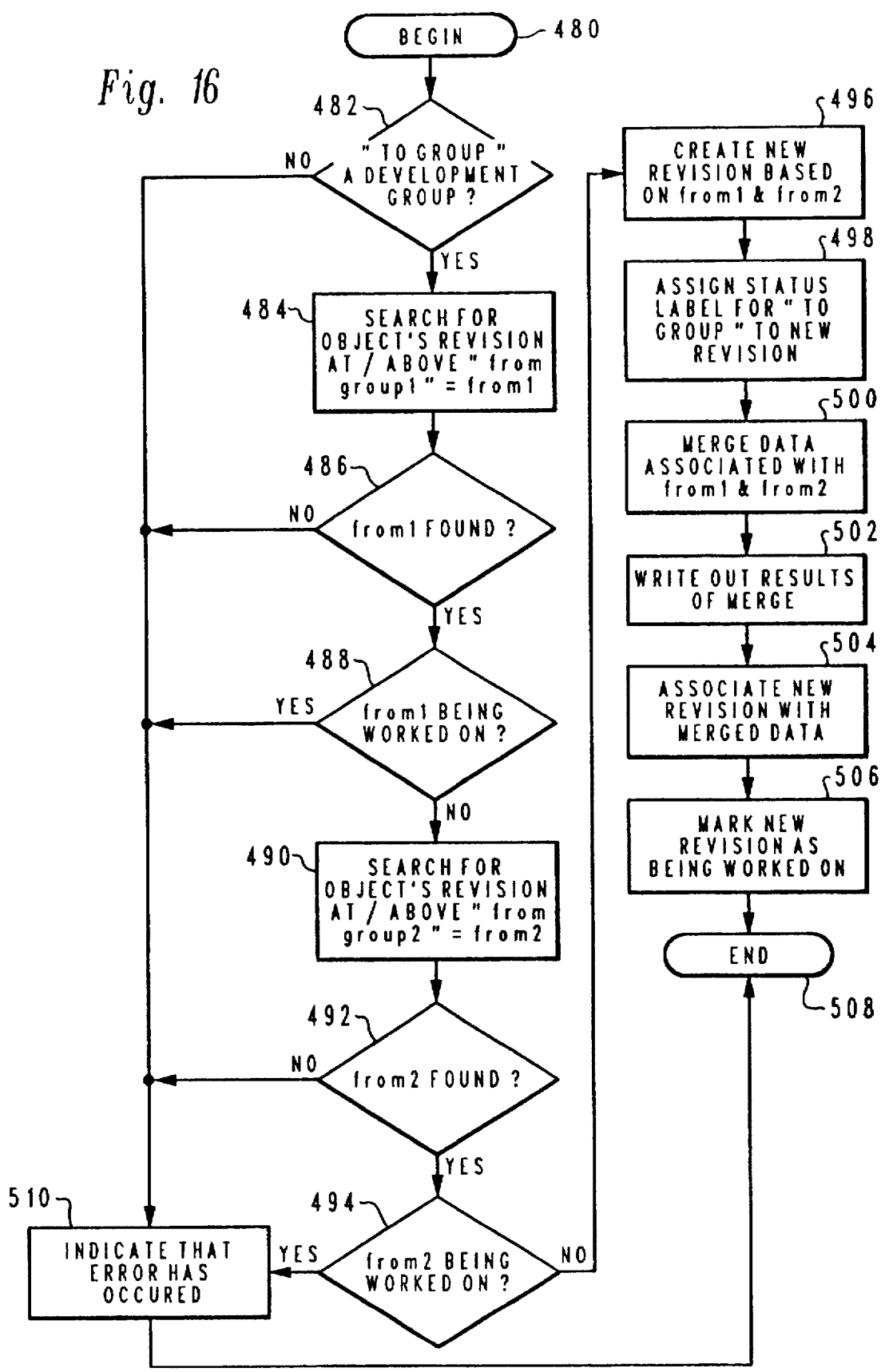
FIG. 16 is a high level logic flowchart illustrating a method and system for merging an object having revisions located in two groups into a third group in accordance with a preferred embodiment of the present invention.

Referring now to FIG. 16, a flowchart illustrating a method and system for merging an object's revisions located in two groups into a third group is depicted in accordance with a preferred embodiment of the present invention. The process begins as illustrated in block 480 and thereafter proceeds to block 482, which depicts a determination of whether or not the "to group" is a development group. As stated before, other criteria may be utilized in accordance with a preferred embodiment of the present invention in block 482. If the "to group" is a development group, the process then advances to block 484. Block 484 illustrates a search to find the object's revision at or above "from group one". Afterward, a determination is made as to whether or not the search found a "from1" as illustrated in block 486. Upon finding a "from1", the process proceeds to block 488. Block 488 depicts a determination of whether or not somebody is already working on "from1". If no one is already working on from1, the process then advances to block 490. Block 490 illustrates searching for the object's revision at or above "from group two", which is designated "from2".

Afterward, the process proceeds to block 492, which depicts a determination of whether or not the search found a "from2". If a "from2" is found, the process then advances to block 494, which illustrates a determination of whether or not somebody is already working on "from2". If "from2" is not already being worked on, the process then proceeds to block 496, which depicts the creation of a new revision based on "from1" and "from2". Thereafter the label for the "to group" is assigned to the new revision as illustrated in block 498. Block 500 depicts the merger of the data associated with "from1" and "from2". Thereafter, the process proceeds to block 502. Block 502 illustrates the writing out of the results of the merge. In writing out the results of the merge, data resulting from the merger of data originating from two revisions is stored within the data processing system in revision contents database 206, illustrated in FIG. 5 in accordance with a preferred embodiment of the present invention. The process then advances to block 504, which depicts the association of the results of the merge with the new revision. The merge is accomplished without losing concurrent or parallel modifications in "from1" and "from2". Thereafter, the process advances to block 506, which illustrates marking the new revision as being worked on. The process then terminates as depicted in block 508.

Referring back to block 482, if the "to group" is not a development group, the process then proceeds to block 510. Block 510 illustrates the indication of the occurrence of an error. The process also advances to block 510 from block 486 if the search does not find a "from1". Similarly, the process advances to block 510 from block 488 if someone is already working 24 on from1.

Referring again to block 492, if the search did not find a from2 the process also proceeds to block 510 to indicate the occurrence of an error. Additionally, if somebody is already working on "from2" in the determination illustrated in block 494, the process advances to block 510, which depicts the occurrence of an error.

Although some of the flowcharts are directed towards use by a user and other flowcharts are directed towards internal subroutines, the flowcharts depicted herein may be implemented either for interface with a user, or as a subroutine, or as both, in accordance with a preferred embodiment of the present invention.

The present invention provides an advantage over the branching model and the hierarchical promotion model by incorporating features found in both models. Additionally, a user does not need to understand or know the revision history to find a revision regardless of the changes or modifications made.

While the invention has been particularly shown and described with reference to a preferred embodiment, it will be understood by those skilled in the art that various changes in form and detail may be made therein without departing from the spirit and scope of the invention.

What is claimed is:

1. A method for maintaining revision control of a set of revisions within a data processing system, wherein said set of revisions are linearly interrelated such that a subsequent revision is related to at least one preceding revision and each revision is created within a hierarchial promotion structure having a plurality of levels, said method comprising the data processing implemented steps of:

creating a database which includes data identifying said linear interrelation between revisions within said set of revisions, said data including a revision identifier associated with each of said set of revisions; and associating a status indicator with each revision within said hierarchial promotion structure, wherein a user may access said set of revisions utilizing a revision identifier or hierarchial promotion structure indicator.

2. The method for maintaining revision control of a set of revisions according to claim 1, further comprising:

promoting a revision within said set of revisions within said hierarchial promotion structure by disassociating said status indicator associated with said revision and associating a new status indicator indicating said revisions new location within said hierarchial promotion structure such that concurrent modifications to said set of revisions are not lost.

3. The method for maintaining revision control of a set of revisions according to claim 2, further comprising:

searching for a revision within said set of revisions utilizing status labels to determine said revisions location within said hierarchial promotion structure.

4. A method for maintaining revision control of a set of objects within a data processing system, wherein said set of objects are linearly interrelated such that a subsequent object is related to a preceding object and each object is created within a hierarchial promotion structure having a plurality of levels, said method comprising the data processing implemented steps of:

creating a database which includes data identifying said linear interrelation between objects within said set of objects, said data including a revision identifier associated with each of said set of objects; and associating a status indicator with each object within said hierarchial promotion structure, wherein a user may access said set of objects utilizing a revision identifier or hierarchial promotion structure indicator.

5. The method for maintaining revision control of a set of objects according to claim 4, further comprising:

promoting an object within said set of objects within said hierarchial promotion structure by disassociating said status indicator associated with said object and associating a new status indicator indicating said objects new location within said hierarchial promotion structure.

6. The method for maintaining revision control of a set of objects according to claim 5, further comprising:

searching for an object within said set of objects utilizing status labels to determine said objects location within said hierarchial promotion structure.

7. A data processing system for maintaining revision control of a set of objects within said data processing system, wherein said set of objects are linearly interrelated such that a subsequent object is related to at least one preceding object and each object is created within a hierarchial promotion structure having a plurality of levels, said data processing system comprising:

creation means for creating a database which includes data identifying said linear interrelation between objects within said set of objects, said data including a revision identifier associated with each of said set of objects; and association means for associating a status indicator with each object within said hierarchial promotion structure, wherein a user may access said set of objects utilizing a revision identifier or hierarchial promotion structure indicator.

8. The data processing system of claim 7 further comprising:

promotion means for promoting an object within said set of objects within said hierarchial promotion structure by disassociating said status indicator associated with said object and associating a new status indicator indicating said objects new location within said hierarchial promotion structure.

9. The data processing system of claim 8 further comprising:

search means for searching for an object within said set of objects utilizing status labels to determine said objects location within said hierarchial promotion structure.

10. A data processing system for maintaining revision control of an object having a plurality of revisions within said data processing system, wherein said plurality of revisions are linearly interrelated such that a subsequent revision is related to at least one preceding object and each object is created within a hierarchial promotion structure having a plurality of groups, said data processing system comprising:

a database which includes data identifying said linear interrelation between revisions comprising said object, said data including a revision identifier associated with each of said plurality of revisions; and association means for associating a status indicator with each revision within said hierarchial promotion structure, wherein a user may access said plurality of revisions utilizing a revision identifier or hierarchial promotion structure indicator.

11. The data processing system of claim 10, wherein each status indicator is associated with a group.

12. The data processing system of claim 11 further comprising:

search means for searching for one of said plurality of revisions based on selecting a status indicator.

13. The data processing system of claim 12 further comprising:

promotion means for promoting a revision in a first group to a second group within said hierarchial promotion system.

14. The data processing system of claim 13, wherein said promotion means includes:

means for disassociating said status indicator associated with said revision; and assignment means for assigning a status indicator associated with said second group to said revision.

15. The data processing system of claim 14 further comprising revision means for revising an object including:

search means for finding one of said plurality of revisions of said object closest to a group at or above said group within said hierarchial promotion structure, wherein said one of said plurality of revisions is a base revision; and creation means for creating a new revision at said group comprising:

means for copying said base revision to said group if said base revision is located above said group within said hierarchial promotion structure, wherein said copied base is said new revision;

means for assigning said new revision said status indicator associated with said group; and means for updating said database to indicate an association between said new revision and said base revision.

16. The data processing system of claim 15 further comprising means for merging two parallel revisions into a new revision without losing modifications from each of the revisions.

17. The data processing system of claim 16 further comprising means for updating said database such that the new revision may be promoted over either of said two parallel revisions.

18. A data processing system for maintaining revision control of a set of revisions for an object within said data processing system, wherein said set of revisions are linearly interrelated such that a subsequent revision is related to at least one preceding revision and each revision is created within a hierarchial promotion structure having a plurality of levels, said data processing system comprising:

a set of revisions for an object;

a database including data identifying said linear interrelation between revisions within said set of revisions, said data including a revision identifier associated with each said set of revisions;

association means for associating a status indicator with each revision within said hierarchial promotion structure;

access means for accessing a revision within said set of revisions utilizing said revision identifier; and promotion means for promoting a revision within said set of revisions within said hierarchial promotion structure by disassociating said status indicator associated with said revision and associating a new status indicator indicating said revision's new location within said hierarchial promotion structure such that concurrent modifications to said set of revisions are not lost, wherein a plurality of users may share said plurality of revisions.

19. Computer readable code on a computer readable medium for maintaining revision control of a set of revisions of an object, wherein the set of revisions are linearly interrelated such that a subsequent revision is related to at least one preceding revision, and each revision is created within a hierarchical promotion structure having a plurality of levels, said computer readable code comprising:

first subprocesses for creating a database which includes data identifying the linear interrelation between revisions within the set of revisions, the data including a revision identifier associated with each revision within said set of revisions; and second subprocesses for associating a status indicator with each revision within said hierarchical promotion structure, wherein a user may access the revisions utilizing a revision identifier or hierarchical promotion identifier.

* * * * *

UNITED STATES PATENT AND TRADEMARK OFFICE
CERTIFICATE OF CORRECTION

PATENT NO. : 5,787,444
DATED : July 28, 1998
INVENTOR(S) : Christopher Henry Gerken, Ruth E. Willenborg, Stacy Renee Joines and Bruce Walter Hanover It is certified that error appears in the above-identified patent and that said Letters Patent is hereby corrected as shown below:

On the title page, item [54] & Column 1:

In the Title:     Please delete "Contol" and insert -- Control --.

Signed and Sealed this

Third Day of August, 1999

Attest:

Q. TODD DICKINSON

Attesting Officer      Acting Commissioner of Patents and Trademarks